United States Patent
Rezaiifar et al.

(10) Patent No.: US 9,117,263 B2
(45) Date of Patent: Aug. 25, 2015

(54) NOISE REMOVAL FROM IMAGES CONTAINING TEXT

(71) Applicant: QUALCOMM Incorporated, San Diego, CA (US)

(72) Inventors: Ramin Rezaiifar, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 13/733,741

(22) Filed: Jan. 3, 2013

(65) Prior Publication Data

US 2013/0294693 A1 Nov. 7, 2013

Related U.S. Application Data

(60) Provisional application No. 61/642,318, filed on May 3, 2012.

(51) Int. Cl.
| | |
|---|---|
| *G06T 5/00* | (2006.01) |
| *H04N 1/409* | (2006.01) |
| *G06K 9/34* | (2006.01) |
| *G06K 9/40* | (2006.01) |

(52) U.S. Cl.
CPC ............... *G06T 5/002* (2013.01); *G06K 9/346* (2013.01); *G06K 9/40* (2013.01); *H04N 1/409* (2013.01)

(58) Field of Classification Search
CPC .... H04N 1/40075; H04N 1/4092; G06T 5/20; G06T 5/002; G06T 5/006

USPC ......... 382/266, 269, 260, 261, 264, 167, 176; 358/3.06, 1.9
See application file for complete search history.

(56) References Cited

U.S. PATENT DOCUMENTS

| | | | | |
|---|---|---|---|---|
| 4,982,294 | A | * | 1/1991 | Morton et al. ................ 358/465 |
| 5,272,545 | A | | 12/1993 | Mita |
| 5,351,314 | A | * | 9/1994 | Vaezi ............................ 382/264 |
| 5,647,027 | A | | 7/1997 | Burges et al. |
| 6,885,477 | B2 | * | 4/2005 | Karidi et al. ................. 358/3.27 |

(Continued)

FOREIGN PATENT DOCUMENTS

WO 8901205 A1 2/1989

OTHER PUBLICATIONS

Tomas Svoboda, et al. "Simple spatial operations", Image Processing, Analysis and Machine Vision . . . publish on Aug. 31, 2007. chapter 5 pp. 46.*

(Continued)

*Primary Examiner* — Mekonen Bekele
(74) *Attorney, Agent, or Firm* — Silicon Valley Patent Group LLP

(57) ABSTRACT

The noise in an image having text is removed by convolving a shaped kernel centered on a pixel for each pixel in the image. The shaped kernel has a shape configured to identify pixels that are not part of the text. For example, the shaped kernel may be shaped with zeros in a center of the kernel to identify pixels that are not part of the text. A value for the pixel is set to erase the pixel when the resulting convolution value for the pixel is less than a threshold. The process may be repeated multiple times for differently shaped kernels, including kernels of different sizes and different configurations, such as having values greater than one in at least one of a row, column, and diagonal.

36 Claims, 4 Drawing Sheets

(56) References Cited

U.S. PATENT DOCUMENTS

| | | | |
|---|---|---|---|
| 6,947,178 B2* | 9/2005 | Kuo et al. | 358/3.08 |
| 7,899,258 B2* | 3/2011 | Liu et al. | 382/232 |
| 2005/0276504 A1 | 12/2005 | Chui et al. | |
| 2007/0217701 A1* | 9/2007 | Liu et al. | 382/234 |
| 2008/0068660 A1* | 3/2008 | Loce et al. | 358/3.06 |
| 2008/0291295 A1* | 11/2008 | Kato et al. | 348/231.99 |
| 2010/0111400 A1 | 5/2010 | Ramirez et al. | |
| 2010/0238354 A1 | 9/2010 | Shmueli et al. | |
| 2011/0222769 A1* | 9/2011 | Galic et al. | 382/173 |
| 2011/0249905 A1 | 10/2011 | Singh et al. | |
| 2014/0140635 A1* | 5/2014 | Wu et al. | 382/266 |

OTHER PUBLICATIONS

International Search Report and Written Opinion—PCT/US2013/035330—ISA/EPO—Jun. 5, 2013.

* cited by examiner

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 0 | 0 | 1 | 1 | 1 |
| 1 | 1 | 1 | 0 | 0 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Fig. 2

| 1 | 1 | 2 | 1 | 1 |
|---|---|---|---|---|
| 1 | 1 | 2 | 1 | 1 |
| 2 | 2 | 0 | 2 | 2 |
| 1 | 1 | 2 | 1 | 1 |
| 1 | 1 | 2 | 1 | 1 |

Fig. 3

| 2 | 1 | 1 | 1 | 2 |
|---|---|---|---|---|
| 1 | 2 | 1 | 2 | 1 |
| 2 | 2 | 0 | 2 | 2 |
| 1 | 2 | 1 | 2 | 1 |
| 2 | 1 | 1 | 1 | 2 |

Fig. 4

NOISE REMOVAL FROM IMAGES CONTAINING TEXT

CROSS-REFERENCE TO PENDING PROVISIONAL APPLICATION

This application claims priority under 35 USC 119 to U.S. Provisional Application No. 61/642,318, filed May 3, 2012, entitled "Noise Removal From Images Containing Text," which is assigned to the assignee hereof and which is incorporated herein by reference.

BACKGROUND

1. Background Field

Embodiments of the subject matter described herein are related generally to processing images to remove noise, and more specifically to automatically processing images having text to remove noise.

2. Relevant Background

Optical character readers (OCRs) conventionally convert images into machine-encoded text. Noise in images, however, may degrade the performance of OCR systems. Morphology techniques have been developed to remove noise, such as background texture or "speckle." Conventional noise removal techniques are generally effective, but often modify the text in the resulting documents, sometimes making the text less readable.

SUMMARY

The noise in an image having text is removed by convolving a shaped kernel centered on a pixel for each pixel in the image. The shaped kernel has a shape configured to identify pixels that are not part of the text. For example, the shaped kernel may be shaped with zeros in a center of the kernel and ones everywhere else to identify isolated pixels that are not part of the text. A value for the pixel is set to erase the pixel when the result of convolving the kernel with the patch of the same size around the pixel of interest is less than a threshold. The process may be repeated multiple times for differently shaped kernels, including kernels of different sizes and different configurations, such as having values greater than one in at least one of a row, column, and diagonal.

In one implementation, a method of removing noise in an image that includes text includes receiving the image that includes the text; convolving a shaped kernel centered on each of a plurality of subsets of pixels in the image to produce a convolution value for each subset of pixels in the plurality of subsets of pixels, the shaped kernel having a shape configured to identify subsets of pixels that are not part of the text; setting a value to erase a subset of pixels when the convolution value for the subset of pixels is less than a threshold to generate a filtered image; and producing the filtered image.

In one implementation, an apparatus to remove noise in an image that includes text, includes an image interface to receive the image that includes the text; and a processor coupled to receive the image, the processor being configured to convolve a shaped kernel centered on each of a plurality of subset of pixels in the image to produce a convolution value for each subset of pixels in the plurality of subsets of pixels, the shaped kernel having a shape configured to identify subsets of pixels that are not part of the text; and set a value to erase a subset of pixels when the convolution value for the subset of pixels is less than a threshold to generate a filtered image, and to produce the filtered image.

In one implementation, an apparatus to remove noise in an image that includes text includes means for receiving the image that includes the text; means for convolving a shaped kernel centered on each of a plurality of subsets of pixels in the image to produce a convolution value for each subset of pixels in the plurality of subsets of pixels, the shaped kernel having a shape configured to identify subsets of pixels that are not part of the text; means for setting a value to erase a subset of pixels when the convolution value for the subset of pixels is less than a threshold to generate a filtered image; and means for producing the filtered image.

In one implementation, a storage medium including program code stored thereon includes program code to program code to receive an image that includes text; program code to convolve a shaped kernel centered on each of a plurality of subsets of pixels in the image to produce a convolution value for each subset of pixels in the plurality of subsets of pixels, the shaped kernel having a shape configured to identify subsets of pixels that are not part of the text; program code to set a value to erase a subset of pixels when the convolution value for the subset of pixels is less than a threshold to generate a filtered image; and program code to produce the filtered image.

BRIEF DESCRIPTION OF THE DRAWING

FIG. 2, by way of example, illustrates an 8×8 kernel, having 0's at the 2×2 region in the center and 1's elsewhere.

FIG. 3 illustrates a 5×5 kernel having 2's in the center row and column, 0 in the center and 1's elsewhere.

FIG. 4 illustrates a 5×5 kernel with 2's on the diagonals, 0 in the center, and 1's elsewhere.

DETAILED DESCRIPTION

The noise reduction techniques described herein may be used on optically scanned images having text. The scanned images may be obtained with a desktop scanner, hand-held scanner, digital camera, or any other manner in which text is converted to a digital image. The noise, e.g., speckle, in the image may be reduced by identifying and removing pixels "isolated" from the text in the image, while leaving the pixels that are part of the text. Thus, pixels that are part of letters or punctuation in the text are not affected. Accordingly, the noise reduction techniques described herein reduce noise but do not adversely affect the text that is contained in the image.

Figure 1:
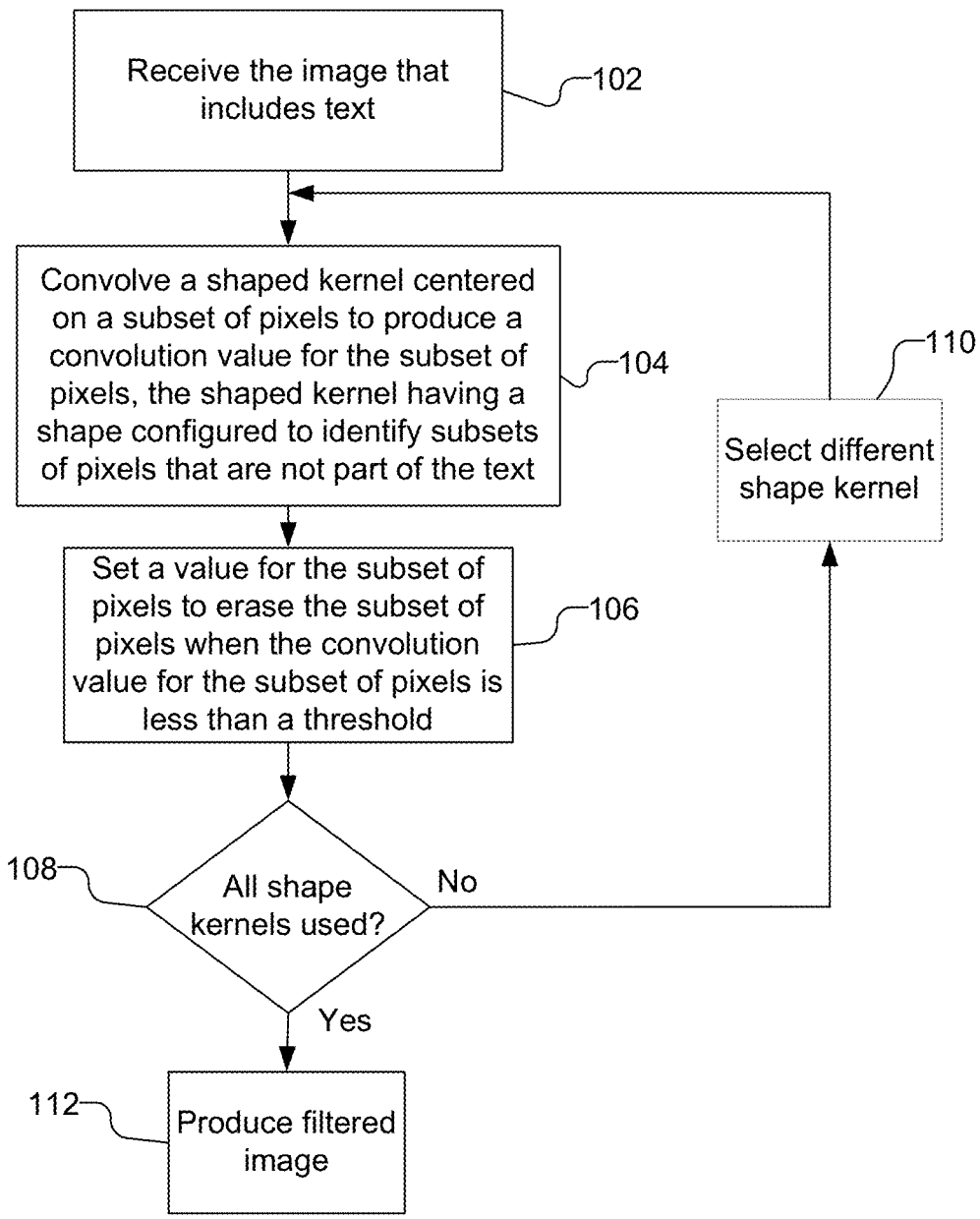
FIG. 1 is a flow chart illustrating a method of removing noise in an image having text without adversely affecting the text.

FIG. 1 is a flow chart illustrating a method of removing noise in a scanned image having text without adversely affecting the text. The method may be a computer implemented method in which a computer may be programmed or otherwise configured to perform the various described acts. As illustrated, an image having text is received (102), e.g., image data is received by a computer performing the method. If desired, the image may be processed, e.g., using adaptive thresholding and close and/or open morphology, which is well known in the art. For example, given a source (src) image, a destination (dst) image is created as follows:

$$dst(x, y) = \begin{cases} \max \text{ Value} & \text{if } src(x, y) > T(x, y) \\ 0 & \text{otherwise} \end{cases} \quad \text{eq. 1}$$

where T(x,y) is the weighted sum (e.g., Gaussian window) of a neighborhood of (x,y). The dst image is used as a mask for copying the src image to the scanned image. Close morphology operation may be performed on the resulting scanned image to reduce noise and open morphology operation may be performed to connect nearby regions. Noise reduction may then be performed to remove "isolated" patches of noise.

To perform the noise reduction, for each subset of pixels in the scanned image, a shaped kernel centered on the subset of pixels is convolved to produce a convolution value for the pixel (104). The shaped kernel has a shape configured to identify subsets of pixels that are not part of the text. For example, the shaped kernel may be shaped with zeros in the center of the kernel to identify whether a subset of pixels at the center of the shaped kernel is unlikely to be part of the text. The subset of pixels may be a single pixel or may include more than one pixel. For the sake of simplicity, the subset of pixels will be assumed herein to be a single pixel, and thus the subset of pixels will be sometimes referred to as a pixel or the pixel. Nevertheless, it should be understood that if desired, the subset of pixels may include more than one pixel.

FIG. 2, by way of example, illustrates an 8×8 kernel, having 0's at the 2×2 region in the center and 1's elsewhere. A convolution value s(x,y) for the pixel may be produced by determining a summation of an inner product of a patch of pixels surrounding the pixel in the image (I(x',y') and the shaped kernel (K(x',y')). The patch(x,y) of pixels is the same size as the kernel and is centered on the pixel (x,y). Thus, for each pixel (x,y) in the image, the following is computed:

$$s(x,y) = \Sigma_{(x',y') \in patch(x,y)} I(x',y') K(x',y') \quad \text{eq. 2}$$

A pixel that is too near to an edge of the image to be centered with the shaped kernel may be ignored or the edge of the image may be extended by replicating the pixels along the edge or by extending the edge with a constant intensity so that the shaped kernel may be applied to the desired pixel. A convolution value for the pixel may then be produced in the same manner discussed above.

A value for the subset of pixels is set to erase the subset of pixels when the convolution value for the subset of pixels is less than a threshold (106) to generate a filtered image. In other words, if s(x,y)<threshold, pixels of the image at the center of the kernel are set to be erased, e.g., white if the scanned image has a white background or black if the scanned image has a black background. The threshold may be selected based on an average intensity for the image or in any other desired manner and may be determined empirically.

The process may be repeated for the image using one or more shaped kernels with different dimensions. For example, a shaped kernel that is 3×3 with a 0 value in the center may be used in addition to the 8×8 kernel with 0's in the 2×2 center region. Thus, as illustrated in FIG. 1, if all shape kernels have not been used (108), a different shape kernel may be selected (110) and the process repeated. The selected thresholds used to erase the pixel may be different for each different shaped kernel, or the same threshold may be used for all of the kernels, which is possible because the s(x,y) in eq. 2 is normalized by the number of ones in the kernel. Additionally, other shapes may be used for the shaped kernel. By way of example, a second shaped kernel may be used that has a shape configured to assign higher weights to pixels that are likely to be part of the alphabet characters used in the text centered at the pixel under consideration, e.g., horizontal or vertical line segments, or other shapes in the image that are desired to be preserved. For example, the second shaped kernel may be shaped with values greater than one in at least one of a row, column, and diagonal. FIG. 3, by way of example, illustrates a 5×5 kernel having 2's in the center row and column, 0 in the center, and 1's elsewhere. FIG. 4, by way of example, illustrates a 5×5 kernel with 2's on the diagonals, 0 in the center, and 1's elsewhere. The shaped kernel's in FIGS. 3, 4, and 5 include 0 in the center so that the pixel(s) in the center of the patch do not influence the decision of whether the center pixel is isolated. Thus, the criterion for erasing pixel(s) is based on what is surrounding the pixel(s) and not based on the value of the pixel(s) under consideration. Additionally, the different shaped kernels may increase in size with each repetition. If desired, the different shaped kernels may increase in size for a number of repetitions and then subsequently decrease in size for a number of repetitions and applied to the image in sequence. For example, the process may be performed using kernels having zeros in the center and having dimensions of 3×3, 5×5, 8×8, 5×5, and then 3×3.

When all the shape kernels have been used (108), the resulting filtered image may be produced (112). For example, the filter image may be produced by a computer, e.g., by displaying the resulting image, printing the resulting image, or storing the resulting image in memory.

Identifying and removing isolated pixels in a scanned image with text using shaped kernels is advantageous as it requires only a few simple shaped kernels that may be used for many applications. Contrarily, identifying and retaining pixels that are part of the text in a scanned image may require many different shaped kernels to identify different possible text shapes and, thus, adequately reducing noise may be problematic for various applications where text can vary from a uniform shape, e.g., as with handwriting and logos, various fonts, etc.

Figure 5:
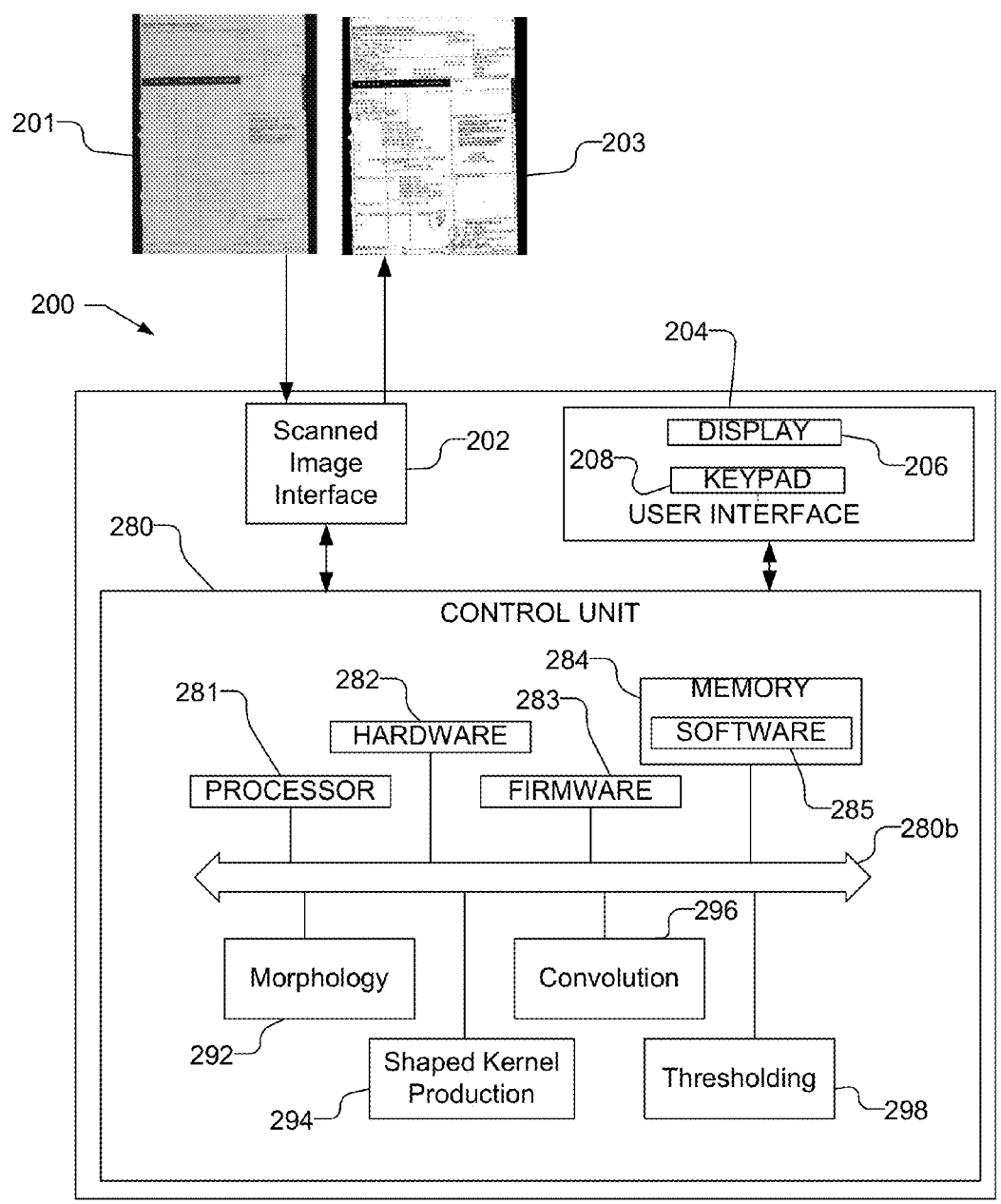
FIG. 5 is a block diagram of an apparatus capable of reducing noise in an image with text using the described process.

FIG. 5 is a block diagram of an apparatus 200 configured to reduce noise in a scanned image with text using the described process. The apparatus 200 includes a scanned image interface 202 for receiving the scanned image 201, which contains text. The scanned image interface 202 may be any connection capable of receiving the scanned image 201, including an image scanner, a network connection to a scanner, or a camera. As illustrated, the scanned image interface 202 may produce the resulting de-noised image 203 as well. Additionally or alternatively, the de-noised image 203 may be displayed, e.g., on display 206 or simply stored in memory, e.g., memory 284 of the apparatus 200. The apparatus may include a user interface 204 that includes the display 206 and a keypad 208 or other input device through which the user can input information into the apparatus 200. Of course, the apparatus 200 may include other elements unrelated to the present disclosure.

The apparatus 200 also includes a control unit 280 that is connected to and communicates with the scanned image interface 202. The control unit 280 may be provided by a bus 280b, processor 281 and associated memory 284, hardware 282, software 285, and firmware 283. The control unit 280 may include morphology unit 292, a shaped kernel production unit 294, a convolution unit 296 and a thresholding unit 298, which operate as discussed above.

The various processing units, e.g., morphology unit 292, shaped kernel production unit 294, convolution unit 296 and thresholding unit 298, are illustrated separately from processor 281 for clarity, but may be part of the processor 281 or implemented in the processor based on instructions in the software 285 which is run in the processor 281. It will be understood as used herein that the processor 281, and/or the various processing units, can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the apparatus, and is not to be limited to any particular type of memory or number of memories, or type of media upon which memory is stored.

The methodologies described herein may be implemented by various means depending upon the application. For example, these methodologies may be implemented in hardware 282, firmware 183, software 285, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 284 and executed by the processor 281. Memory may be implemented within or external to the processor 281. If implemented in firmware and/or software, the functions may be stored as one or more instructions or code on a storage medium that is computer-readable, wherein the storage medium does not include transitory propagating signals. Examples include storage media encoded with a data structure and storage media encoded with a computer program. Storage media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, an apparatus to remove noise in an image that includes text may include means for receiving the image that includes the text which may be, e.g., the scanned image interface 202. A means for convolving a shaped kernel centered on each of a plurality of subsets of pixels in the image to produce a convolution value for each subset of pixels in the plurality of subsets of pixels, the shaped kernel having a shape configured to identify subsets of pixels that are not part of the text may be e.g., the convolution unit 296 with the shaped kernel production unit 294 or processor 281 performing instructions received from software 285. Means for means for setting a value to erase a subset of pixels when the convolution value for the subset of pixels is less than a threshold to generate a filtered image may be, e.g., the thresholding unit 298 or processor 281 performing instructions received from software 285. Means for producing the filtered image may be, e.g., the scanned image interface 202 or processor 281 causing the filtered image to be stored in memory 284. Means for convolving a second shaped kernel centered on each of the plurality of subsets of pixels to produce a second convolution value for each subset of pixels, the second shaped kernel having a shape configured to assign higher weights to subsets of pixels that are likely to be part of the alphabet used in the text or other shapes in the image that are desired to be preserved may be, e.g., the convolution unit 296 with the shaped kernel production unit 294 or processor 281 performing instructions received from software 285. Means for repeatedly convolving different shaped kernels centered on each subset of pixels to produce a plurality of convolution values and means for setting the value to erase the subset of pixels when any the plurality of convolution values is less than any threshold associated with any of the different shaped kernels may be, e.g., the convolution unit 296 with the shaped kernel production unit 294 and the thresholding unit 298 or processor 281 performing instructions received from software 285.

Figure 6:
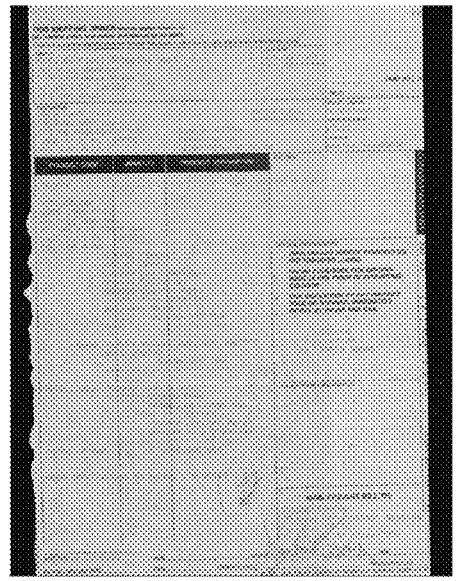
FIG. 6 illustrates an image with text.
Figure 7:
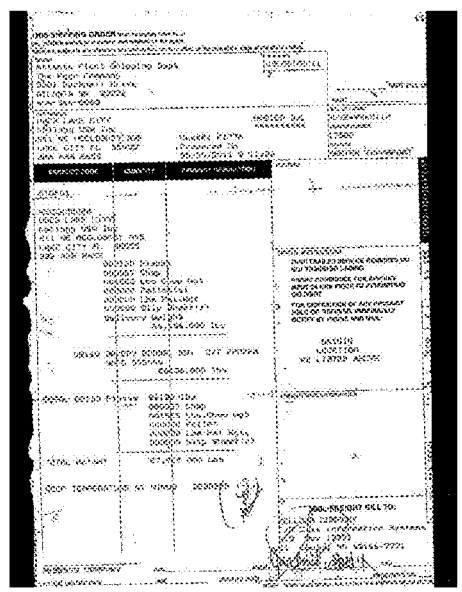
FIG. 7 illustrates the image after being de-noised as describe herein.
Figure 8:
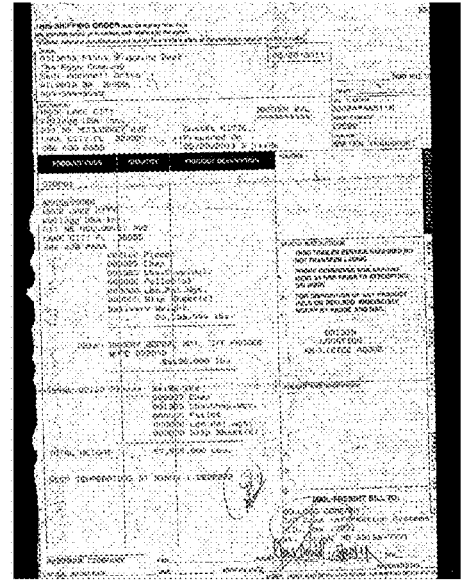
FIG. 8 illustrates the image after being conventionally processed using only adaptive filtering and morphology.

By way of illustration, FIG. 6 illustrates a scanned image with text. FIG. 7 illustrates the scanned image after being de-noised as describe herein. FIG. 8, on the other hand, illustrates the scanned image after being conventionally processed using only adaptive filtering and morphology. As can be seen, with conventional processing, the results of which are illustrated in FIG. 8, a significant amount of noise (speckle) that adversely affects readability of the document remains, while use of de-noising, as described herein significantly removes the remaining noise as illustrated in FIG. 7.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of removing noise in an image that includes text, the method comprising:
   receiving the image that includes the text;
   convolving a shaped kernel centered on each of a plurality of subsets of pixels in the image to produce a convolution value for each subset of pixels in the plurality of subsets of pixels, the shaped kernel having a shape configured to identify subsets of pixels that are not part of the text based solely on pixels that surround the subsets of pixels centered in the shaped kernel;
   setting a value for a subset of pixels to erase the subset of pixels in the image when the convolution value for the subset of pixels is less than a threshold to generate a filtered image; and
   producing the filtered image.

2. The method of claim 1, wherein each subset of pixels comprises one pixel.

3. The method of claim 1, wherein the shaped kernel is shaped with zeros in a center of the shaped kernel and ones everywhere else to identify isolated pixels that are unlikely to be part of the text.

4. The method of claim 1, further comprising convolving a second shaped kernel centered on each of the plurality of subsets of pixels to produce a second convolution value for each subset of pixels, the second shaped kernel having a shape configured to assign higher weights to subsets of pixels that are likely to be part of an alphabet used in the text or other shapes in the image that are desired to be preserved.

5. The method of claim 4, wherein the second shaped kernel is shaped with values greater than one in at least one of a row, column, and diagonal.

6. The method of claim 1, wherein producing the convolution value for each subset of pixels comprises determining a summation of an inner product of a patch of pixels surrounding each subset of pixels and the shaped kernel.

7. The method of claim 1, further comprising repeatedly convolving different shaped kernels centered on each subset of pixels to produce a plurality of convolution values and setting the value to erase the subset of pixels when any of the plurality of convolution values is less than any threshold associated with any of the different shaped kernels.

8. The method of claim 7, wherein the different shaped kernels increase in size with each repetition.

9. The method of claim 7, wherein the different shaped kernels increase in size for a number of repetitions and then decrease in size for a second number of repetitions.

10. An apparatus to remove noise in an image that includes text, the apparatus comprising:
    an image interface to receive the image that includes the text; and
    a processor coupled to receive the image, the processor being configured to convolve a shaped kernel centered on each of a plurality of subset of pixels in the image to produce a convolution value for each subset of pixels in the plurality of subsets of pixels, the shaped kernel having a shape configured to identify subsets of pixels that are not part of the text based solely on pixels that surround the subsets of pixels centered in the shaped kernel; and set a value for a subset of pixels to erase the subset of pixels in the image when the convolution value for the subset of pixels is less than a threshold to generate a filtered image, and to produce the filtered image.

11. The apparatus of claim 10, wherein each subset of pixels comprises one pixel.

12. The apparatus of claim 10, wherein the shaped kernel is shaped with zeros in a center of the shaped kernel and ones everywhere else to identify isolated pixels that are unlikely to be part of the text.

13. The apparatus of claim 10, wherein the processor is further configured to convolve a second shaped kernel centered on each of the plurality of subsets of pixels to produce a second convolution value for each subset of pixels, the second shaped kernel having a shape configured to assign higher weights to subsets of pixels that are likely to be part of an alphabet used in the text or other shapes in the image that are desired to be preserved.

14. The apparatus of claim 13, wherein the second shaped kernel is shaped with values greater than one in at least one of a row, column, and diagonal.

15. The apparatus of claim 10, wherein the processor is configured to produce the convolution value for each subset of pixels by being configured to determine a summation of an inner product of a patch of pixels surrounding each subset of pixels and the shaped kernel.

16. The apparatus of claim 10, wherein the processor is further configured to repeatedly convolve different shaped kernels centered on each subset of pixels to produce convolution values and set the value to erase the subset of pixels when any the convolution values is less than a thresholds associated with any of the different shaped kernels.

17. The apparatus of claim 16, wherein the different shaped kernels increase in size with each repetition.

18. The apparatus of claim 16, wherein the different shaped kernels increase in size for a number of repetitions and then decrease in size for a second number of repetitions.

19. An apparatus to remove noise in an image having text, the apparatus comprising:
    means for receiving the image that includes the text;
    means for convolving a shaped kernel centered on each of a plurality of subsets of pixels in the image to produce a convolution value for each subset of pixels in the plurality of subsets of pixels, the shaped kernel having a shape configured to identify subsets of pixels that are not part of the text based solely on pixels that surround the subsets of pixels centered in the shaped kernel;
    means for setting a value for a subset of pixels to erase the subset of pixels in the image when the convolution value for the subset of pixels is less than a threshold to generate a filtered image; and
    means for producing the filtered image.

20. The apparatus of claim 19, wherein each subset of pixels comprises one pixel.

21. The apparatus of claim 19, wherein the shaped kernel is shaped with zeros in a center of the shaped kernel and ones everywhere else to identify isolated pixels that are unlikely to be part of the text.

22. The apparatus of claim 19, further comprising means for convolving a second shaped kernel centered on each of the plurality of subsets of pixels to produce a second convolution value for each subset of pixels, the second shaped kernel having a shape configured to assign higher weights to subsets of pixels that are likely to be part of an alphabet used in the text or other shapes in the image that are desired to be preserved.

23. The apparatus of claim 22, wherein the second shaped kernel is shaped with values greater than one in at least one of a row, column, and diagonal.

24. The apparatus of claim 19, wherein the means for producing the convolution value for each subset of pixels determines a summation of an inner product of a patch of pixels surrounding each subset of pixels and the shaped kernel.

25. The apparatus of claim 19, further comprising means for repeatedly convolving different shaped kernels centered on each subset of pixels to produce a plurality of convolution values and means for setting the value to erase the subset of pixels when any the plurality of convolution values is less than any threshold associated with any of the different shaped kernels.

26. The apparatus of claim 25, wherein the different shaped kernels increase in size with each repetition.

27. The apparatus of claim 25, wherein the different shaped kernels increase in size for a number of repetitions and then decrease in size for a second number of repetitions.

28. A storage medium including program code stored thereon, comprising:
    program code to receive an image that includes text;
    program code to convolve a shaped kernel centered on each of a plurality of subsets of pixels in the image to produce a convolution value for each subset of pixels in the plurality of subsets of pixels, the shaped kernel having a shape configured to identify subsets of pixels that are not part of the text based solely on pixels that surround the subsets of pixels centered in the shaped kernel;
    program code to set a value for a subset of pixels to erase the subset of pixels in the image when the convolution value for the subset of pixels is less than a threshold to generate a filtered image; and
    program code to produce the filtered image.

29. The storage medium of claim 28, wherein each subset of pixels comprises one pixel.

30. The storage medium of claim 28, wherein the shaped kernel is shaped with zeros in a center of the shaped kernel and ones everywhere else to identify isolated pixels that are unlikely to be part of the text.

31. The storage medium of claim 28, further comprising program code to convolve a second shaped kernel centered on each of the plurality of subsets of pixels to produce a second convolution value for each subset of pixels, the second shaped kernel having a shape configured to assign higher weights to subsets of pixels that are likely to be part of an alphabet used in the text or other shapes in the image that are desired to be preserved.

32. The storage medium of claim 31, wherein the second shaped kernel is shaped with values greater than one in at least one of a row, column, and diagonal.

33. The storage medium of claim 28, wherein the program code to produce the convolution value for each subset of pixels comprises program code to determine a summation of an inner product of a patch of pixels surrounding each subset of pixels and the shaped kernel.

34. The storage medium of claim 28, further comprising program code to repeatedly convolve different shaped kernels centered on each subset of pixels to produce a plurality of convolution values and set the value to erase the subset of pixels when any the plurality of convolution values is less than any threshold associated with any of the different shaped kernels.

35. The storage medium of claim 34, wherein the different shaped kernels increase in size with each repetition.

36. The storage medium of claim 34, wherein the different shaped kernels increase in size for a number of repetitions and then decrease in size for a second number of repetitions.

* * * * *